United States Patent
Spahl

[19]

[11] Patent Number: 5,943,336
[45] Date of Patent: Aug. 24, 1999

[54] SWITCHING DEVICE AND METHOD FOR ASSIGNMENT OF TIME SLOTS TO A MULTICHANNEL LINK IN A SWITCHING DEVICE

[75] Inventor: Gerd Dieter Spahl, Puchheim, Germany

[73] Assignee: Siemens Aktiengesellschaft, Munich, Germany

[21] Appl. No.: 08/823,320

[22] Filed: Mar. 21, 1997

[30] Foreign Application Priority Data

Mar. 21, 1996 [DE] Germany .................. 196 11 236

[51] Int. Cl.$^6$ ....................................... H04J 3/00
[52] U.S. Cl. ............................. 370/376; 370/458
[58] Field of Search ..................... 370/375, 376, 370/378, 379, 362, 372, 374, 458

[56] References Cited

U.S. PATENT DOCUMENTS

| | | | |
|---|---|---|---|
| 3,840,707 | 10/1974 | Hemdal | 370/369 |
| 5,123,010 | 6/1992 | Pospischil | 370/58.1 |
| 5,130,979 | 7/1992 | Ohtawa | 370/374 |
| 5,175,539 | 12/1992 | Richter | 340/825.8 |
| 5,784,369 | 7/1998 | Romiti et al. | 370/379 |

*Primary Examiner*—Hassan Kizou
*Assistant Examiner*—Daniel Previl
*Attorney, Agent, or Firm*—Hill & Simpson

[57] ABSTRACT

In the method for assignment of time slots to a multichannel link, the incoming and outgoing time slots are each provided with an identification which unambiguously defines the sequence. At least one auxiliary variable is determined which, for a given time, relates to the difference between a number of outgoing time slots and incoming time slots for the multichannel link within the respective frames. The method and the switching device ensure a multichannel link with guaranteed bit integrity.

22 Claims, 5 Drawing Sheets

SWITCHING DEVICE AND METHOD FOR ASSIGNMENT OF TIME SLOTS TO A MULTICHANNEL LINK IN A SWITCHING DEVICE

BACKGROUND OF THE INVENTION

The present invention relates to a switching device and a method for assignment of time slots to a multichannel link.

Switching devices in communication systems are used to set up, control and clear down connections for transmission of useful information. In the simplest case, the switching device has a coupling stage which connects a subscriber A to a subscriber B. The connections of the subscribers A and B may in this case be located at one port or different ports.

It is furthermore known that a switching device can implement a plurality of connections, using the so-called time division multiplex mode, via a single connecting line. Such a physical connecting line can transmit a plurality of channels which are formed by time slots in the time division multiplex mode. As a result, there is no hard-wired physical connection in a coupling stage in a switching device which is operated using this principle, time slots being assigned for a connection, instead.

If a connection is considered from a subscriber A to a subscriber B via a switching device, the connection being regarded for simplicity as being unidirectional, then incoming time slots from the subscriber A must be assigned in the switching device to outgoing time slots from the switching device to the subscriber B. The information which is transmitted during the time slots is thus switched. In the case of the time division multiplex mode, the time slots are organized on the basis of frames, that is to say one frame contains K time slots, which can each be assigned to different connections. The same time slot in each case designates an existing connection from frame to frame.

A bit rate, for example 64 kbit per second for B channel in ISDN switching devices is assigned to each of the channels formed by a time slot. If a connection from the subscriber A to the subscriber B now requires a higher bit rate, then a multichannel link is required. This just means that a plurality of time slots must be assigned to the connection within a frame. However, in this case, it is not necessary for these time slots to be transmitted on the same physical connecting line.

In comparison with single-channel links, additional difficulties occur in the case of multichannel links. Normally, a continuous information stream is produced by the subscriber A. The information elements in this information stream are arranged in accordance with a specific sequence. This sequence must also be ensured at the subscriber B, after transmission of the information. The subscriber's communications terminals and the switching device satisfy this requirement. It is desirable that such problems be kept away from the communications terminals and that the handling of multichannel links in accordance with the requirements be provided in the switching devices.

SUMMARY OF THE INVENTION

It is an object of the present invention to guarantee the sequence of the information elements in the incoming time slots for the outgoing time slots when time slots are being assigned to a multichannel link in a switching device.

In general terms the present invention is a method for assignment of time slots to a multichannel link in a switching device. The multichannel link has at least two incoming and two outgoing time slots. A specific number of incoming time slots within an incoming frame are assigned a first unambiguous identification which defines the sequence, and the incoming time slots form the multichannel information to be switched. The same number of outgoing time slots in an outgoing frame are assigned a second unambiguous identification which defines the sequence, and the outgoing time slots are available for the multichannel link. A first auxiliary variable is determined, which indicates the maximum difference between a number of outgoing time slots and a number of incoming time slots for the multichannel link within the respective frames up to a time which includes an outgoing time slot. This first auxiliary variable is used as an assignment offset for all outgoing time slots for assignment to each one of the incoming time slots.

Advantageous developments of the present invention are as follows.

A second auxiliary variable is determined which designates an addition of the minimum difference between a number of outgoing time slots and a number of incoming time slots for the multichannel link within the respective frames before a time which is formed by an outgoing time slot, with the number of time slots to be assigned. The incoming time slot which is assigned to the time of the outgoing time slot is included. This second auxiliary variable is used as an assignment offset for all outgoing time slots for assignment to each one of the incoming time slots.

As an alternative to the use of the first or second auxiliary variable a value between the first auxiliary variable and the second auxiliary variable is used as the assignment offset for all outgoing time slots for assignment to each one of the incoming time slots.

A buffer storage delay of the switching device is taken into account for buffer storage of the multichannel information to be switched. For the assignment of the outgoing time slots, the start of an incoming frame is defined as being offset by at least the buffer storage delay before the start of an outgoing frame, the of assignment of the first identification being retained.

For a switching device which combines a plurality of time slots to form a word if the multichannel information to be switched is being buffer stored, all the incoming time slots of a word are counted for the first incoming time slot of the respective word for the determination of the auxiliary variable.

At least the incoming and/or outgoing time slot of a frame is distributed between different connecting lines. Time slots which are present at the same time on different connecting lines are counted together for the determination of the auxiliary variable.

For one or more coupling stages within the switching device, the assignment offset or the total of the assignment offset of the individual coupling stages is equal to the product of the number of the time slots to be switched, using a natural number.

For bidirectional traffic condition, the assignment of the time slots is carried out separately in both directions.

The present invention is also a switching device for switching a multichannel link, having a database for outgoing time slots which can be assigned to a number of incoming time slots, and having a control device for assignment of the outgoing time slots to each one of the incoming time slots. The multichannel link has at least two incoming and two outgoing time slots. A first unambiguous identification, which defines the sequence, is assigned in the database to a specific number of incoming time slots within an incoming frame. The incoming time slots forming the multichannel information to be switched, and a second unambiguous identification, which defines the sequence, are assigned in the database to the same number of outgoing time slots in an outgoing frame. The outgoing time slots are available for the multichannel link. Using the control device, a first auxiliary variable is determined, which indicates the maximum difference between a number of outgoing time slots and a number of incoming time slots for the multichannel link within the respective frames up to a time which includes an outgoing time slot. This first auxiliary variable is used as an assignment offset for all outgoing time slots for assignment to in each case one incoming time slot.

The present invention is also a switching device for switching a multichannel link, having a database for outgoing time slots which can be assigned to a number of incoming time slots, and having a control device for assignment of the outgoing time slots to each one of the incoming time slots. The multichannel link has at least two incoming and two outgoing time slots. A first unambiguous identification which defines the sequence, is assigned in the database to a specific number of incoming time slots within an incoming frame. The incoming time slots forming the multichannel information to be switched, and a second unambiguous identification, which defines the sequence, are assigned in the database to the same number of outgoing time slots in an outgoing frame. The outgoing time slots are available for the multichannel link using the control device. A second auxiliary variable is determined which designates an addition of the minimum difference between a number of outgoing time slots and a number of incoming time slots for the multichannel link within the respective frames before a time which is formed by an outgoing time slot, with the number of time slots to be assigned. The incoming time slot which is assigned to the time of the outgoing time slot is included. This second auxiliary variable is used as an assignment offset for all outgoing time slots for assignment to each one of the incoming time slots.

Using the control device as an alternative to the use of the first or second auxiliary variable, a value between the first auxiliary variable and the second auxiliary variable is used as the assignment offset for all outgoing time slots for assignment to in each case one incoming time slot.

A buffer storage delay of the switching device is taken into account for buffer storage of the multichannel information to be switched. For the assignment of the outgoing time slots, the control device defines the start of an incoming frame such that it is offset by at least the buffer storage delay before the start of an outgoing frame, the assignment of the first identification being retained.

The switching device has one or more coupling stages. The control device is structured such that the assignment offset or the total of the assignment offset of the individual coupling stages is selected to be equal to the product of the number of time slots to be switched, using a natural number.

The multichannel link is formed by at least two incoming and two outgoing time slots. The specific number n in this case designates the number of incoming time slots for the multichannel link within an incoming frame having a total of K time slots. An equal number (n) of outgoing time slots in an outgoing frame are now each intended to be assigned an incoming time slot. A first unambiguous identification is assigned to each incoming time slot on the multichannel link in order to identify the sequence of the incoming time slots within an incoming frame. All the information within the incoming time slots on the multichannel link form the multichannel information to be switched.

In the same way, a second unambiguous identification, which defines the sequence, is assigned to the outgoing time slots. A first auxiliary variable is determined, taking account of the position of the incoming and outgoing time slots within the respective frames. This first auxiliary variable indicates the maximum difference between a number of outgoing time slots and incoming time slots for the multichannel link within the respective frames, up to a time which includes an outgoing time slot. This first auxiliary variable can then be used as an assignment offset for all outgoing time slots for assignment to in each case one incoming time slot. An assignment offset of, for example, three in this case means for the multichannel link that the fourth outgoing time slot is assigned to the first incoming time slot, the fifth outgoing time slot is assigned to the second incoming time slot, etc. If, as above, an incoming or outgoing frame has, for example, five time slots, then the third incoming time slot is assigned to the first outgoing time slot of the next outgoing frame. The assignment offset may thus be regarded as a form of indexing.

Alternatively, or in addition to the first auxiliary variable, a second auxiliary variable may also be determined, however, to achieve the object according to the invention. This second auxiliary variable designates a value which defines the addition of a minimum difference between a number of outgoing time slots and incoming time slots for the multichannel link within the respective frames, before a time which is formed by an outgoing time slot, with the number of time slots to be assigned. The incoming time slot is, however, also counted for this point. This second auxiliary variable can also be used as an assignment offset for all outgoing time slots for assignment to in each case one incoming time slot. However, any other value between the first auxiliary variable and the second auxiliary variable is also suitable as an assignment offset.

If the first auxiliary variable is selected for the assignment offset, then there is a minimal delay in the multichannel information in the switching device. However, any other value up to the second auxiliary variable also provides an assignment which guarantees the maintenance of the sequence of the information elements and ensures a minimal frame offset. An important advantage of the method according to the present invention is that the sequence of the information elements (also called the bit integrity in digital switching systems) is achieved for each individual assignment. This renders superfluous any other correction which would be necessary if this bit integrity were not ensured in coupling stages of a switching device. Furthermore, it has been found to be advantageous to be able to select any desired number of outgoing time slots within outgoing frames. The method according to the invention nevertheless produces an assignment of outgoing time slots to incoming time slots which guarantees the bit integrity.

For assignment, it has been assumed until now that incoming and outgoing frames start at the same time and have the same number of time slots. If the multichannel information is buffer stored in the switching device, then a buffer storage delay can be taken into account in that, for the assignment of the outgoing time slots, the start of an incoming frame is defined as being offset by at least the buffer storage delay before the start of an outgoing frame, the assignment of the first identification being retained. The method sequence can be retained as such if the offset corresponds precisely to the buffer storage delay. An individual buffer storage delay can be taken into account for each coupling stage in a switching device.

If the multichannel information to be switched is buffer stored, a plurality of time slots are also combined to form a word. In this case, all the incoming time slots of a word are counted for the determination of the auxiliary variables for the first incoming time slot of the respective word. As the result of this advantageous measure, it is in turn possible individually to match the algorithm to the special features of the individual coupling stages, which are normally governed by the design of the corresponding coupling circuits, as when taking account of the buffer storage delay.

According to a further advantageous refinement, time slots which are present at the same time on different connecting lines are counted together for the determination of the auxiliary variables, if the incoming and/or outgoing time slots of a frame are distributed between different connecting lines. In consequence, the method according to the invention can also be used in switching devices which combine time slots from a plurality of connecting lines and can distribute information from different time slots between a plurality of outgoing connecting lines.

If a switching device has a plurality of coupling stages, the assignment offset or the total of the assignment offset of the individual coupling stages is advantageously selected to be equal to the product of the number of the time slots to be switched, using a natural number. In addition to guaranteeing bit integrity, this also ensures frame integrity, since, not only is the information in the time slots contained in the correct sequence, but also the time slots of the multichannel link of an incoming frame are contained together in one outgoing frame.

According to a further embodiment, the assignment of the time slots in both directions is separated in the case of bidirectional traffic conditions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
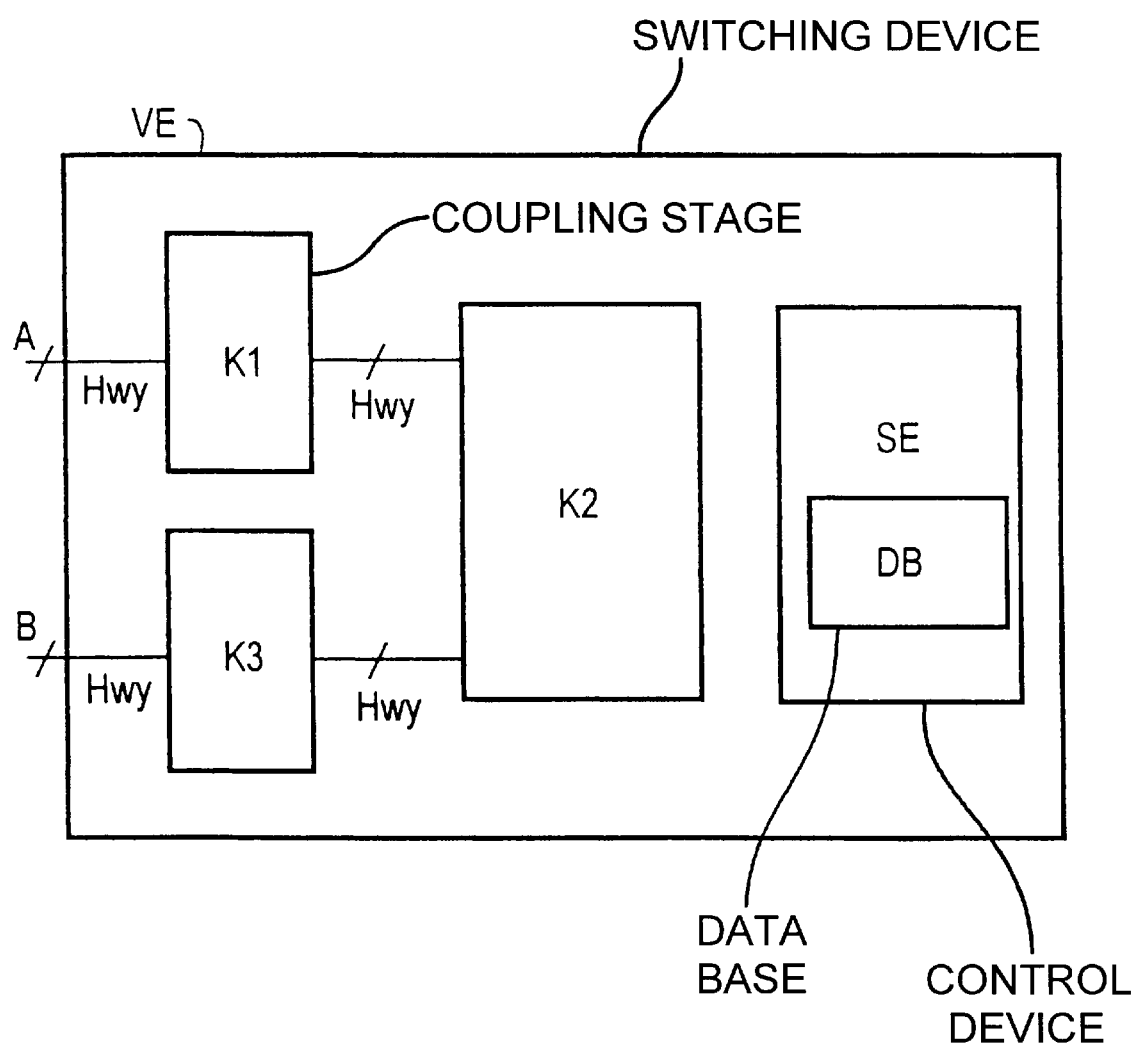
FIG. 1 shows a switching device having three coupling stages.

The example of a switching device VE according to FIG. 1 have three coupling stages K1, K2, K3, the second coupling stage K2 in each case being connected via a highway Hwy, which is composed of connecting lines, to the first coupling stage K1 and to the third coupling stage K3. The coupling stage K1 produces a link via a highway Hwy to a subscriber A, and the third coupling stage K3 produces a link via a further highway Hwy to the subscriber B.

The switching device VE is operated in the time division multiplex mode, so that the transmitted information can be assigned on the connecting lines to time slots within frames. The switching device VE is controlled by a control device SE. The program-controlled control device SE may have memory areas to which, inter alia, a database DB for recording outgoing and incoming time slots $e_i$, $a_j$, which are available for links. When setting up a connection from the subscriber A to the subscriber B, the control device SE makes a selection of time slots $e_i$, $a_j$ on the connecting lines Hwy, by accessing the database DB.

The connection from the subscriber A to the subscriber B is set up as a multichannel link. This means that a plurality of time slots $e_i$, $a_j$, must be used within a frame Re, Ra for the transmission of multichannel information. An algorithm, which will be explained with reference to the following figures, is used for this purpose in the control device SE of the switching device VE. The auxiliary variables provide for assignment of the outgoing time slots to the incoming time slots.

Figure 2:
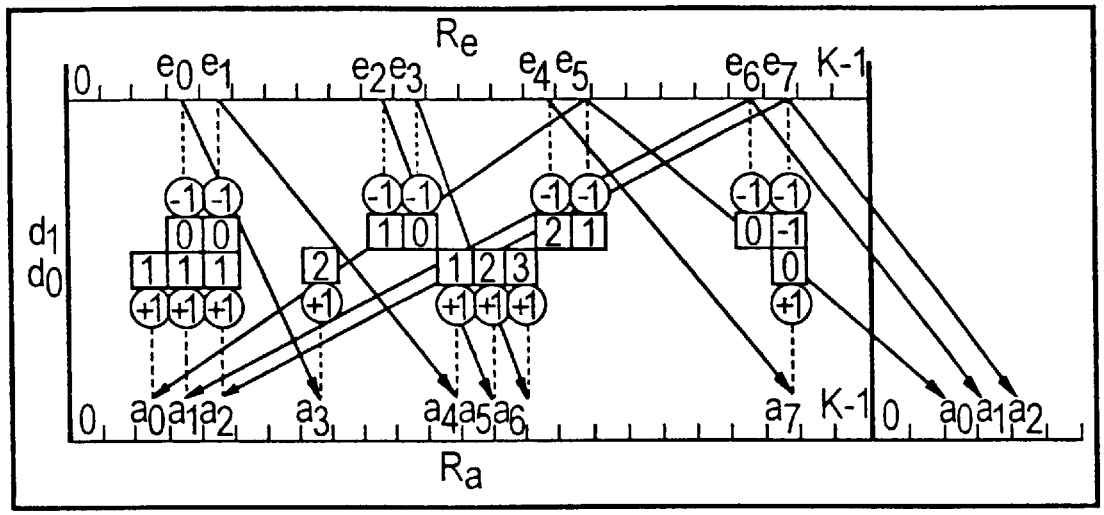
FIG. 2 shows a schematic illustration of the assignment of outgoing time slots to incoming time slots on one connecting line in each case.

According to FIG. 2, the multichannel information has, for example, 8 incoming time slots $e_0$ to $e_7$ within an incoming frame Re having a total of X time slots. The outgoing frame Ra having the same number of K time slots likewise comprises 8 outgoing time slots $a_0$ to $a_7$ which are selected from the databaseDB. The incoming time slots $e_0$ to $e_7$ and the outgoing time slots $a_0$ to $a_7$ have been designated in accordance with their sequence within the frame Re, Ra with an unambiguous first identification i and second identification j. The position of the outgoing and incoming time slots $e_i$, $a_j$ can in this case be selected freely within the incoming and outgoing time frames Re, Ra.

The result of the calculation of the first auxiliary variable d0 and the second auxiliary variable d1 has already been illustrated in FIG. 2. The difference between a number of outgoing time slots $a_j$ and incoming time slots $e_i$ for the multichannel link within the respective frames Ra, Re is determined by the control device SE for each time in an outgoing time slot $a_0$ to $a_7$. The outgoing time slot $a_j$ of the time of the determination is also included in this case. In FIG. 2, the maximum difference, that is to say the first auxiliary variable d0, has been defined as 3 for the seventh outgoing time slot $a_6$.

The second auxiliary variable d1 is determined in that the difference between a number of outgoing time slots $a_j$ and incoming time slots $e_i$ for the multichannel link is determined within the respective frames Re, Ra, before a time which is formed by an outgoing time slot $a_j$, for each time in an incoming time slot $e_0$ to $e_7$. The minimum value has in this case been determined using −1 for the time of the eighth incoming time slot $e_7$. The number of time slots $a_j$ to be assigned is then added to this value −1 (this number is equal to 8), which results, for example, in the value 7 for the second auxiliary variable d1.

The calculation procedure for the first auxiliary variable d0 and second auxiliary variable d1 can be quoted, using a general notation, by the following equations:

$$d0 = \max(|\{a_j | a_j \leq z1\}| - |\{e_i | e_i \leq z1\}|)$$

$$d1 = \min(|\{a_j | a_j < z1\}| - |\{e_i | e_i \leq z1\}|) + n$$

z1 being the time of a time slot and n the number of the incoming time slots $e_i$ on the multichannel link. The term {m¦E} is a set whose elements m have the property E. The operator ¦●¦ in this case indicates the number of elements in the set.

The first auxiliary variable d0 has been selected for assignment in FIG. 2, so that the fourth outgoing time slot $a_3$ is assigned to the first incoming time slot $e_0$, etc. The black solid arrows in this case indicate this assignment. The dashed arrows likewise designate this assignment, but these are the assignments which lead to an offset in the frame and replaced the solid arrows for the corresponding incoming time slots $e_5$ to $e_7$.

Figure 3:
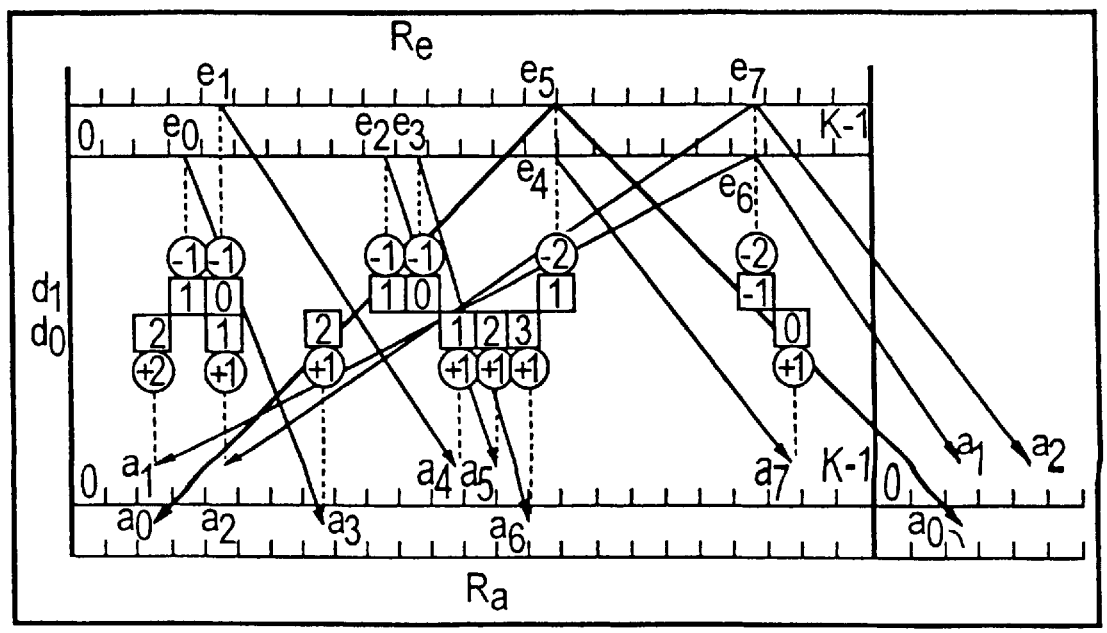
FIG. 3 shows a schematic illustration of the assignment of outgoing time slots to incoming time slots on two connecting lines in each case.

The schematic illustration of the assignment according to FIG. 3 is based on the same principle as the assignment according to FIG. 2. However, it should be noted that both the incoming time slots $e_0$ to $e_7$ and the outgoing time slots $a_0$ to $a_7$ are distributed between in each case two connecting lines (highways) Hwy. Time slots $e_i$, $a_j$ which are present at the same time are included in the determination of the auxiliary variable d0, d1, but are counted together. The value 3 thus results once again for the first auxiliary variable d0, and the value 7 for the second auxiliary variable d1. An assignment of time slots $e_i$, $a_j$ to a multichannel link is once again achieved, while guaranteeing the bit integrity, by using the method sequence according to the invention.

Figure 4:
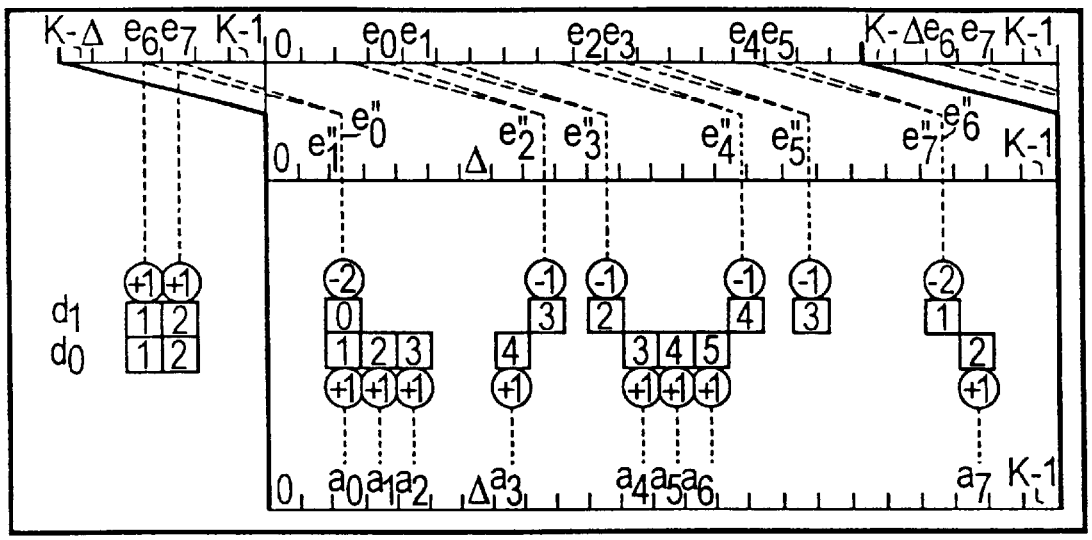
FIG. 4 shows a schematic illustration of the assignment of outgoing time slots to incoming time slots, taking account of a buffer storage delay in the case of word-by-word buffer storage.

The assignment of outgoing time slots $a_j$ to incoming time slots $e_i$ will be explained with reference to FIG. 4, taking account of a buffer storage delay dtsl=6 and buffer storage which combines 2 time slots $e_i$ to form a word. The time of the start of an incoming frame Re in this case precedes the start of an outgoing frame Ra for example by the buffer storage delay dtsl=6. This offset in the start of an incoming frame Re takes account of the buffer storage delay dtsl. At the same time, two time slots $e_i$ are in each case stored together, in the case of this buffer storage.

The seventh and eighth incoming time slots $e_6$, $e_7$ are stored together, in the same way as the fifth and sixth incoming time slots $e_4$, $e_5$. As the result of the joint buffer storage, these time slots in each case act like a single incoming time slot $e_i$. This situation must be taken into account in the determination of the first auxiliary variable d0 and the second auxiliary variable d1. This is done by incoming time slots $e_6$, $e_7$ and $e_4$, $e_5$ being counted together for the time of an outgoing time slot $a_j$. According to FIG. 4, the value 5 was determined for the first auxiliary variable d0, and the value 8 (0) for the second auxiliary variable d1. A value (the assignment offset 1) can then be selected from the value range of the assignment offset 1 between 5 and 8, by means of which outgoing time slots $a_j$ are assigned to incoming time slots $e_i$.

Figure 5:
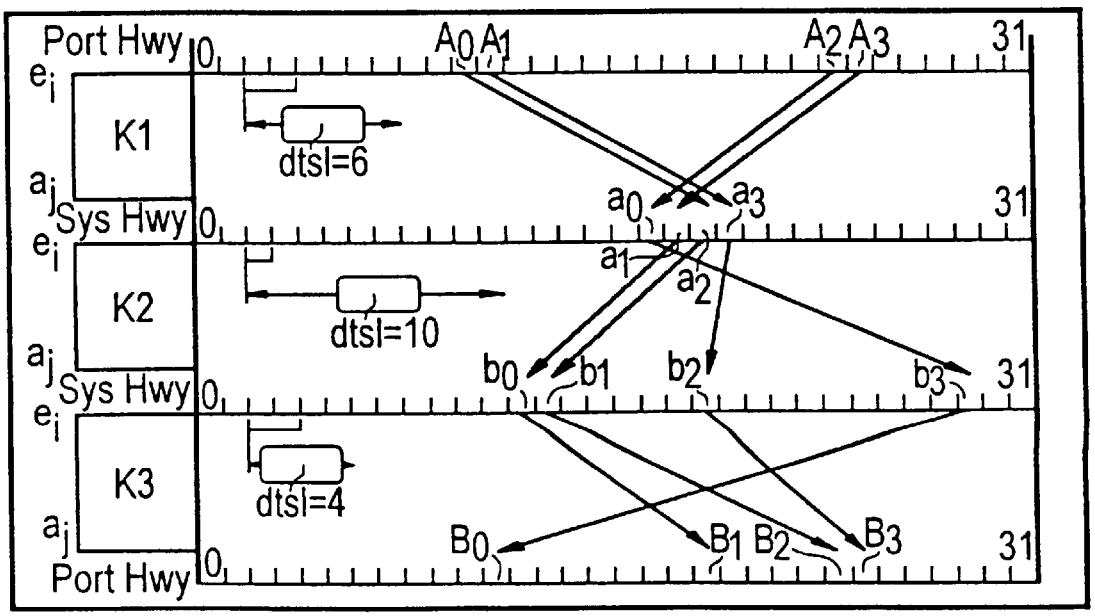
FIG. 5 shows a schematic illustration of the assignment of outgoing time slots to incoming time slots over a plurality of coupling stages.

The assignment of the outgoing time slots $a_j$ to incoming time slots $e_i$ according to FIG. 5 relates to the three coupling stages K1, K2, K3 according to FIG. 1. Four outgoing time slots $a_j$ in the third coupling stage K3 are assigned, using the second coupling stage K2 to four incoming time slots $e_i$ in the first coupling stage K1. The buffer storage delays dtsl in the coupling stages K1, K2, K3 are in this case different. The buffer storage delay dtsl in the first coupling stage K1 is equal to 6, in the second coupling stage K2 is equal to 10, and in the third coupling stage K3 is equal to 4. The first coupling stage K1 and the third coupling stage K3 store two time slots word by word. The second coupling stage K2 carries out the buffer storage, related to time slots. It can be seen from FIG. 5 that the sequence of the information elements in the time slots is maintained on each individual coupling stage K1, K2, K3, that is to say the bit integrity is guaranteed. The assignments which are drawn by solid lines have no frame offset, and those which are drawn by dashed lines have a frame offset of 1. The information in time slot A0 is received, for example, by the subscriber B one frame later in the time slot B2. The time slot A2 is received by the subscriber B two frames later, in the time slot B0.

Figure 6:
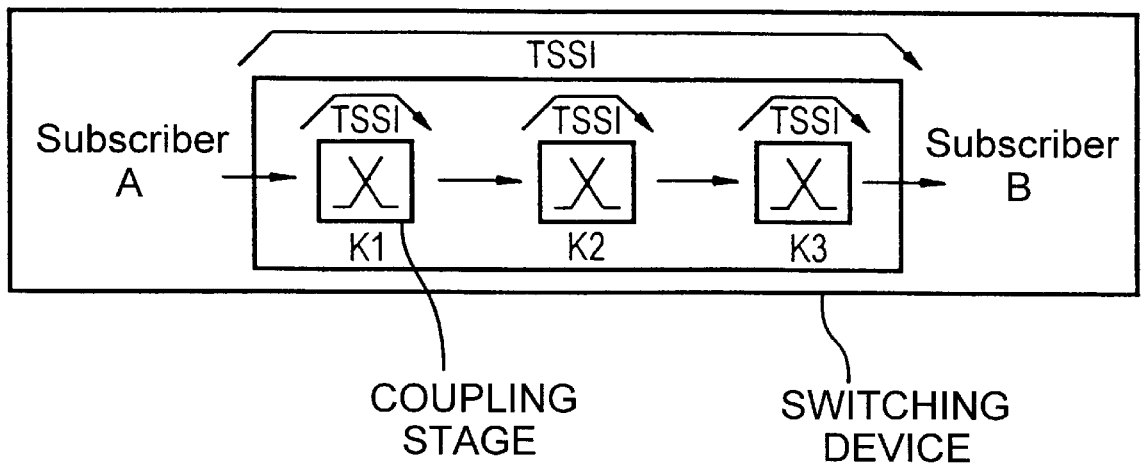
FIG. 6 shows a switching device having three coupling stages and the guarantee of frame integrity in each individual coupling stage.
Figure 7:
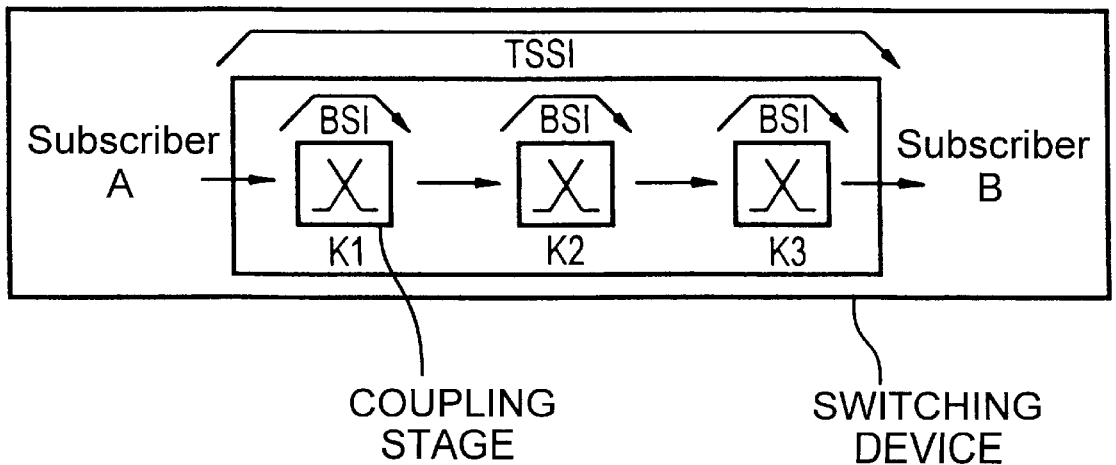
FIG. 7 shows a switching device having three coupling stages, the frame integrity being reproduced in the last coupling stage.

FIGS. 6 and 7 show that frame integrity TSSI can also be achieved using a plurality of coupling stages K1, K2, K3 by suitable selection of the assignment offset 1. In this case, in accordance with FIG. 6, it is possible to produce the frame integrity TSSI in each individual coupling stage K1, K2, K3. However, according to FIG. 7, this can also be done by a correction not being carried out and the frame integrity TSSI not being produced until the last coupling stage K3. The frame integrity TSSI is ensured in that a value is selected from the value range for the assignment offset 1 from the first auxiliary variable d0 to the second auxiliary variable d1, which value is equal to the product of the number n of time slots to be switched in the multichannel link, using a natural number. In the assignment examples in FIGS. 2, 3 and 4, this means that the assignment offset 1 or the total of the assignment offsets 1 of the individual coupling stages K1, K2, K3 is equal to 0, 8, or a multiple of 8.

If it is intended to correct the frame integrity TSSI in the last coupling stage K3, it is in this case advantageous to select specific outgoing time slots $a_j$ within an outgoing frame for the multichannel link. For example, if the pattern of the outgoing time slots $a_j$ corresponds to that of the incoming time slots $e_i$, it is possible to correct the frame integrity TSSI in every case.

If it is intended to produce the bit integrity BSI and/or the frame integrity TSSI in both directions in the case of a bidirectional link, then the method according to the present invention can be applied separately for both switching directions. The method can be used if any required outgoing time slots $a_j$ are selected from the databaseDB. However, it may be advantageous if a specific prior selection, which optimizes the algorithm, is made for the selection of outgoing time slots $a_j$. This measure allows the switching delay to be reduced and a minimal frame offset to be achieved.

Figure 8:
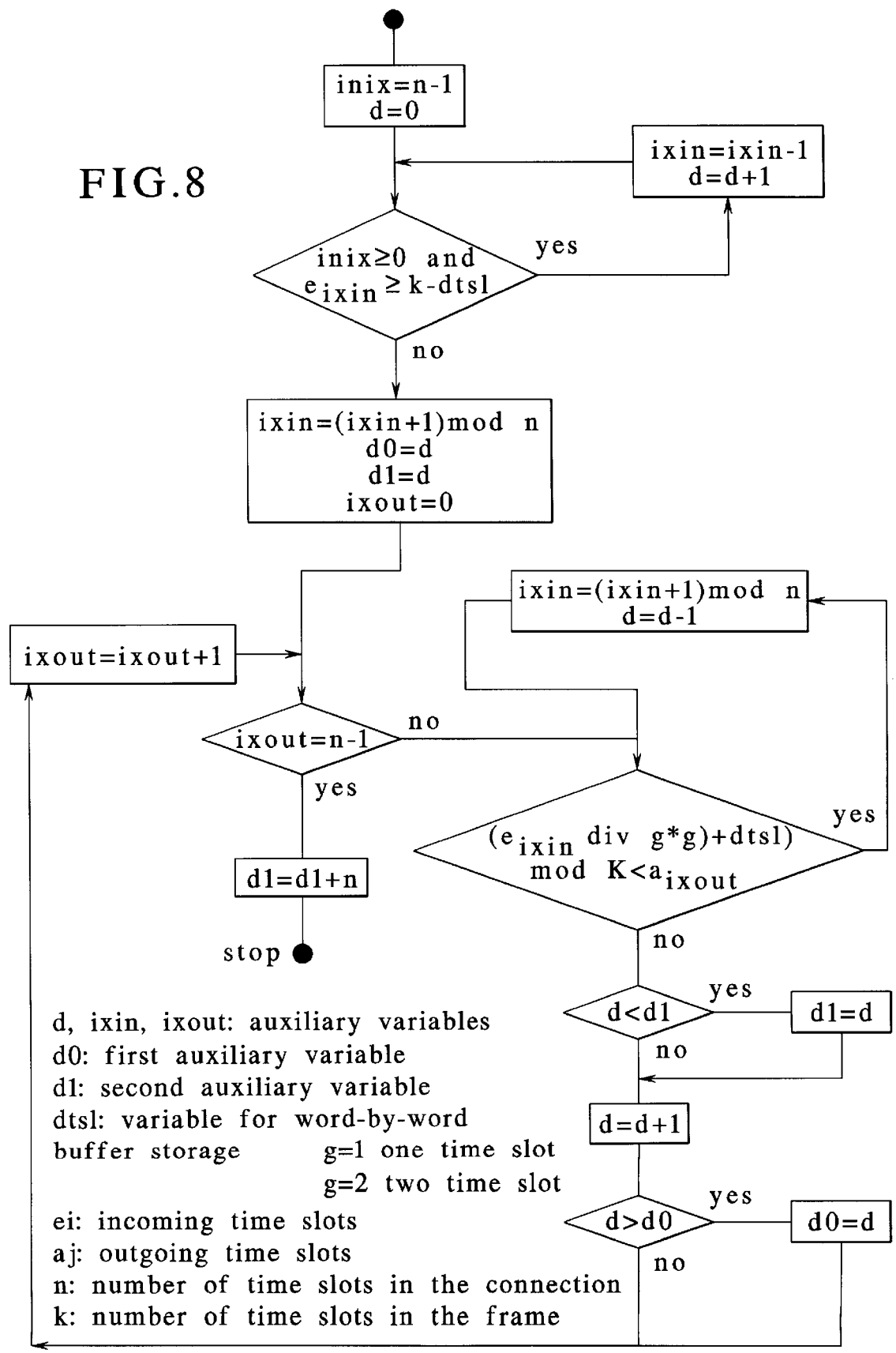
FIG. 8 shows a schematic flow chart of the calculation of the first and the second auxiliary variable.

FIG. 8 shows the calculation of the first auxiliary variable d0 and the second auxiliary variable d1 using a flow chart. This sequence represents one implementation of the equations quoted above. The time slots $e_i$ and $a_j$ are indexed from 0 to n−1. An auxiliary variable ixin is set in a first loop such that an incoming time slot $e_i$ which is indexed with this auxiliary variable ixin arrives before the end of the incoming frame Re, reduced by the buffer storage delay dtsl. An output variable d for the further calculation of the first auxiliary variable d0 and the second auxiliary variable d1 is determined by means of the second loop, taking account of the buffer storage delay dtsl and of any word-by-word buffer storage, in that the set of incoming and outgoing time slots $e_i$ and $a_j$ is considered and compared for different times within a frame Re, Ra.

What is claimed is:

1. A method for assignment of time slots to a multichannel link in a switching device, the multichannel link having at least two incoming and two outgoing time slots, comprising:

assigning to a predetermined number of incoming time slots within an incoming frame a first unambiguous identification which defines a sequence of the incoming time slots, the incoming time slots forming multichannel information to be switched;

assigning to a same number of outgoing time slots in an outgoing frame a second unambiguous identification which defines the sequence, the outgoing time slots being available for the multichannel link;

determining a first auxiliary variable, which indicates a maximum difference between a number of outgoing time slots and a number of incoming time slots for the multichannel link within respective frames up to a time which includes an outgoing time slot; and using the first auxiliary variable as an assignment offset for all outgoing time slots for assignment to each one of the incoming time slots.

2. The method according to claim 1, wherein, as an alternative to use of an auxiliary variable, a value between a first auxiliary variable and a second auxiliary variable is used as the assignment offset for all outgoing time slots for assignment to each one of the incoming time slots.

3. The method according to claim 1, wherein a buffer storage delay of the switching device is taken into account for buffer storage of the multichannel information to be switched, and wherein, for the assignment of the outgoing time slots, a start of an incoming frame is defined as being offset by at least the buffer storage delay before a start of an outgoing frame.

4. The method according to claim 1, wherein for a switching device which combines a plurality of time slots to form a word if the multichannel information to be switched is being buffer stored, all incoming time slots of a word are counted for a first incoming time slot of a respective word for determination of the auxiliary variable.

5. The method according to claim 1, wherein at least one of incoming time slots and outgoing time slots of a frame are distributed between different connecting lines, and wherein time slots which are simultaneously present on different connecting lines are counted together for determination of the auxiliary variable.

6. The method according to claim 1, wherein, for a plurality of coupling stages within the switching device, the assignment offset or a total of assignment offsets of the individual coupling stages is equal to a product of the number of time slots to be switched, using a natural number.

7. The method according to claim 1, wherein, for case of bidirectional traffic condition, the assignment of the time slots is carried out separately in both directions.

8. A method for assignment of time slots to a multichannel link in a switching device, the multichannel link having at least two incoming and two outgoing time slots, comprising:

assigning to a predetermined number of incoming time slots within an incoming frame a first unambiguous identification which defines a sequence of the incoming time slots, the incoming time slots forming multichannel information to be switched;

assigning to a same number of outgoing time slots in an outgoing frame a second unambiguous identification which defines the sequence, the outgoing time slots being available for the multichannel link;

determining a second auxiliary variable which designates an addition of a minimum difference between a number of outgoing time slots and a number of incoming time slots for the multichannel link within respective frames before a time which is formed by an outgoing time slot, with the number of time slots to be assigned, the incoming time slot which is assigned to the time of the outgoing time slot being included; and using the second auxiliary variable as an assignment offset for all outgoing time slots for assignment to each one of the incoming time slots.

9. The method according to claim 8, wherein, as an alternative to use of an auxiliary variable, a value between a first auxiliary variable and a second auxiliary variable is used as the assignment offset for all outgoing time slots for assignment to each one of the incoming time slots.

10. The switching device according to claims 9, wherein the switching device further comprises a plurality of coupling stages, and wherein the control device is structured such that the assignment offset or a total of the assignment offset of the coupling stages is selected to be equal to a product of the number of time slots to be switched, using a natural number.

11. The switching device according to claim 9, wherein a buffer storage delay of the switching device is taken into account for buffer storage of the multichannel information to be switched, and wherein for assignment of the outgoing time slots, the control device defines a start of an incoming frame such that the start is offset by at least the buffer storage delay before a start of an outgoing frame, the assignment of the first identification being retained.

12. The switching device according to claim 9, wherein, utilizing the control device as an alternative to the use of an auxiliary variable, a value between a first auxiliary variable and a second auxiliary variable is the assignment offset for all outgoing time slots for assignment to each one of the incoming time slots.

13. The method according to claim 8, wherein for a switching device which combines a plurality of time slots to form a word if the multichannel information to be switched is being buffer stored, all incoming time slots of a word are counted for a first incoming time slot of a respective word for determination of the auxiliary variable.

14. The method according to claim 8, wherein a buffer storage delay of the switching device is taken into account for buffer storage of the multichannel information to be switched, and wherein, for the assignment of the outgoing time slots, a start of an incoming frame is defined as being offset by at least the buffer storage delay before a start of an outgoing frame, the assignment of the first identification being retained.

15. The method according to claim 8, wherein at least one of incoming time slots and outgoing time slots of a frame are distributed between different connecting lines, and wherein time slots which are simultaneously present on different connecting lines are counted together for determination of the auxiliary variable.

16. The method according to claim 8, wherein, for a plurality of coupling stages within the switching device, the assignment offset or a total of assignment offsets of individual coupling stages of the plurality of coupling stages is equal to a product of the number of time slots to be switched, using a natural number.

17. The method according to claim 8, wherein, for case of bidirectional traffic condition, the assignment of the time slots is carried out separately in both directions.

18. A switching device for switching a multichannel link, comprising:

a database for outgoing time slots which are assignable to a number of incoming time slots;

a control device for assignment of the outgoing time slots to each one of the incoming time slots, the multichannel link having at least two incoming and two outgoing time slots;

a first unambiguous identification, which defines a sequence of the incoming time slots, assigned in the database to a specific number of incoming time slots within an incoming frame, the incoming time slots forming multichannel information to be switched;

a second unambiguous identification, which defines the sequence, assigned in the database to the same number of outgoing time slots in an outgoing frame, the outgoing time slots being available for the multichannel link;

a first auxiliary variable, which is determined via the control device and which indicates a maximum difference between a number of outgoing time slots and a number of incoming time slots for the multichannel link within the respective frames up to a time which includes an outgoing time slot;

the first auxiliary variable being used as an assignment offset for all outgoing time slots for assignment to each one of the incoming time slots.

19. A switching device for switching a multichannel link, comprising:

a database for outgoing time slots which can be assigned to a number of incoming time slots;

a control device for assignment of the outgoing time slots to each one of the incoming time slots, the multichannel link having at least two incoming and two outgoing time slots;

a first unambiguous identification, which defines a sequence of the incoming time slots, assigned in the database to a specific number of incoming time slots within an incoming frame, the incoming time slots forming multichannel information to be switched;

a second unambiguous identification, which defines the sequence, assigned in the database to a number of outgoing time slots in an outgoing frame, the outgoing time slots being available for the multichannel link;

a second auxiliary variable, which is determined via the control device and which designates an addition of a minimum difference between a number of outgoing time slots and a number of incoming time slots for the multichannel link within the respective frames before a time which is formed by an outgoing time slot, with the number of time slots to be assigned, the incoming time slot which is assigned to the time of the outgoing time slot being included; and the second auxiliary variable being used as an assignment offset for all outgoing time slots for assignment to each one of the incoming time slots.

20. The switching device according to claim 19, wherein, utilizing the control device as an alternative to the use of an auxiliary variable, a value between a first auxiliary variable and a second auxiliary variable is the assignment offset for all outgoing time slots for assignment to each one of the incoming time slots.

21. The switching device according to claim 19, wherein a buffer storage delay of the switching device is taken into account for buffer storage of the multichannel information to be switched, and wherein for assignment of the outgoing time slots, the control device defines a start of an incoming frame such that the start is offset by at least the buffer storage delay before a start of an outgoing frame.

22. The switching device according to claims 19, wherein the switching device further comprises a plurality of coupling stages, and wherein the control device is structured such that the assignment offset or a total of the assignment offset of the coupling stages is selected to be equal to a product of the number of time slots to be switched, using a natural number.

* * * * *